Dec. 2, 1969  J. SCHINDLER  3,481,374
ADJUSTABLE SAW DEVICES
Filed Dec. 15, 1966
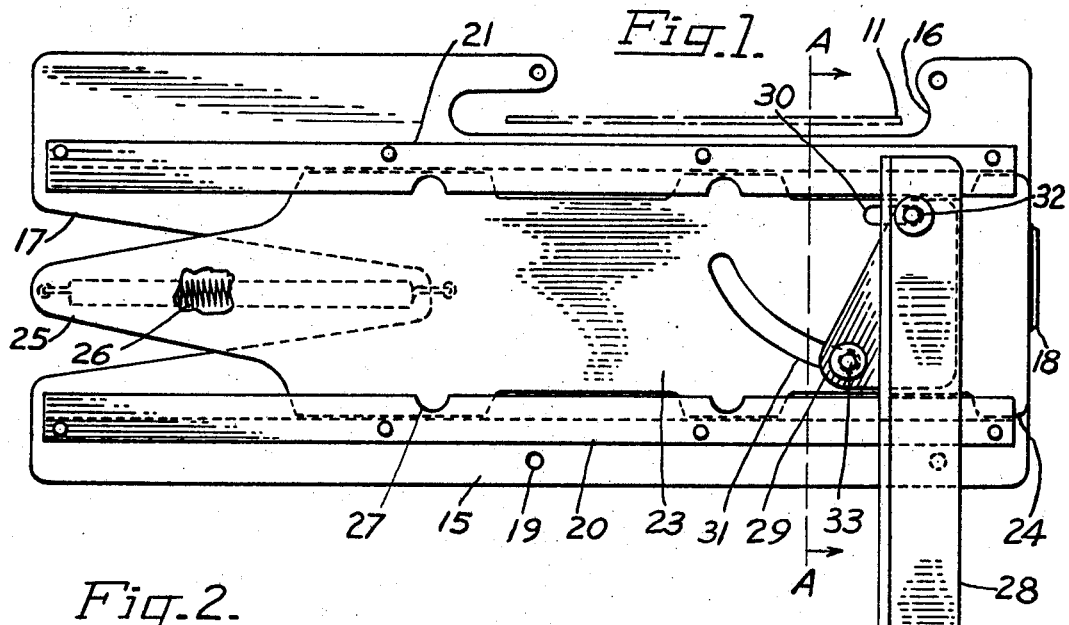
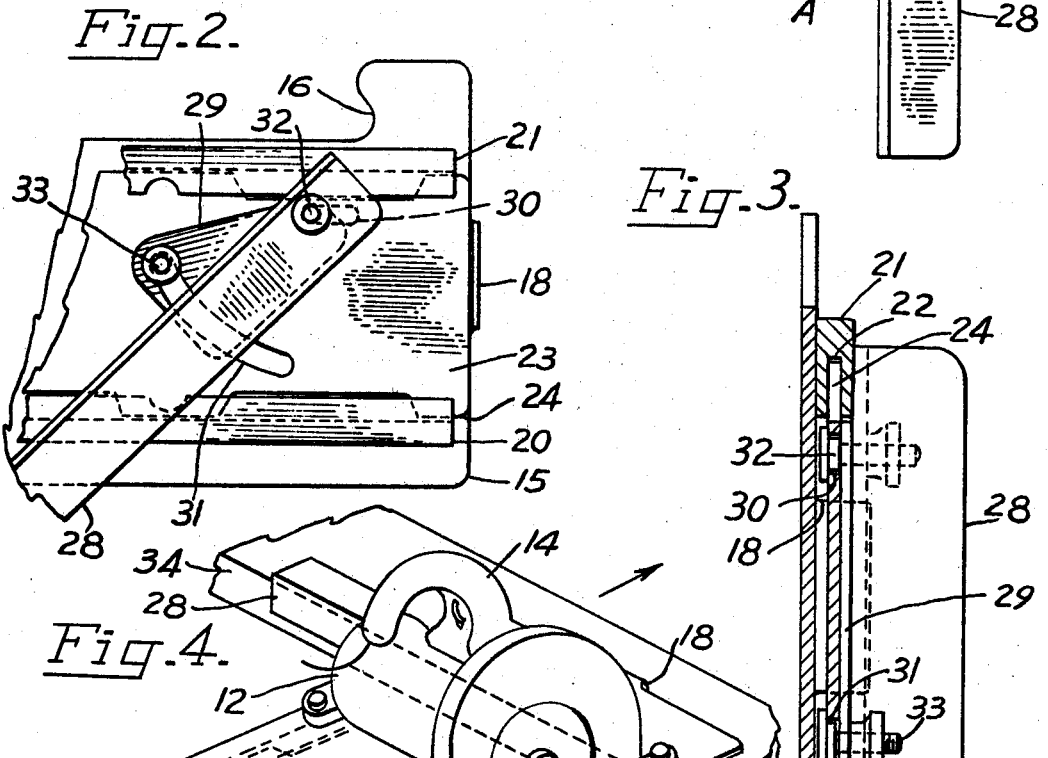
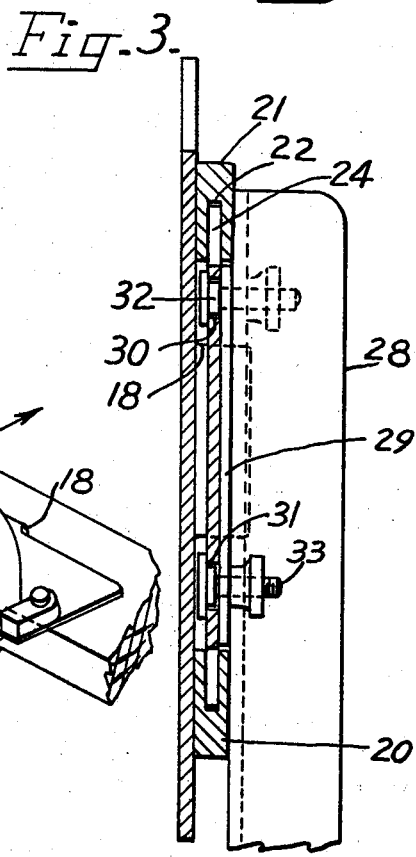
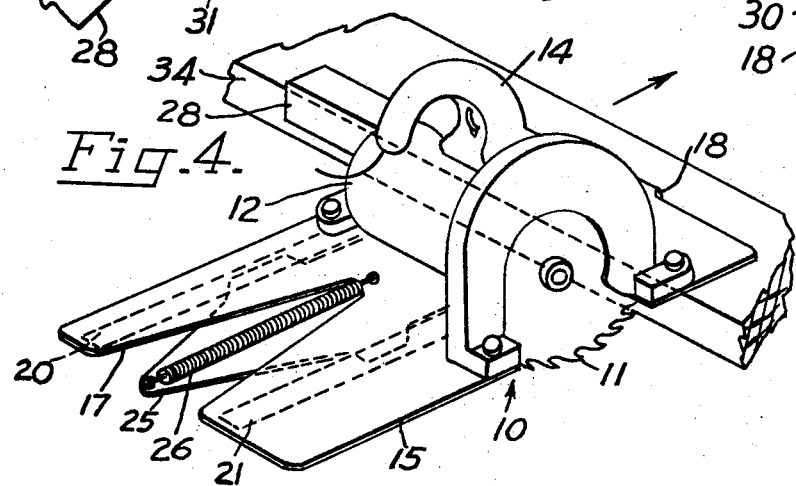

3,481,374
ADJUSTABLE SAW DEVICES
John Schindler, 1160 John St.,
Chehalis, Wash. 98532
Filed Dec. 15, 1966, Ser. No. 603,083
Int. Cl. B27b 27/06
U.S. Cl. 143—6     4 Claims

ABSTRACT OF THE DISCLOSURE

A power saw for cross-cutting, provided with improved means in adjustment for making mitre or angular cuts across material. Adjustments that can be made in a single operation without giving attention to the saw, such as spacing to the work and without loss of fore and aft travel or stroke.

---

My invention relates to portable sawing tools for sawing small lumber such as used for houses and other small structures and also for articles made from presawed or milled wooden boards.

The principal object of my invention is the use of circular power saws combined with improved means, providing a retractable slide and attaching parts connected to a supporting base and rotatable and shifting means for holding the saw tool against lumber squarely or diagonally, making it unnecessary to sight or guide the saw across the lumber being cut.

A second object is to provide a portable saw with means for movement in a fore and aft direction and means for locking the parts in a desired angular position.

A third object is to provide compensating means for keeping the forward cutting edge of the saw in approximately the same marginal spacing from the near edge of lumber being cut at an angle thereto, so as not to lose saw travel due to rotating the base.

In view of the foregoing, my invention consists in certain novel features of construction, combination and arrangement of parts hereinafter described, claimed and shown in the accompanying drawings, in which:

FIGURE 1 is a bottom plan view.

FIGURE 2 is a fragmentary portion of FIGURE 1 with certain parts shown in an adjusted position.

FIGURE 3 is a cross sectional view taken along the line A—A and in the direction indicated by the arrows.

FIGURE 4 is a perspective view of the combined saw tool as applied to and in working location against a piece of lumber.

Referring to the drawing, 10 indicates a commercial type power saw carrying a circular saw 11, housing 12 has a handle 14 for the use of an operator (not shown). Power saw 10 is fastened to a slide 15 provided with a cutout 16 for saw 11 and a long notch 17 extending forwardly from the rear end, the opposite end protrudes downwardly to form a stop 18.

The typical showing of holes 19 for fastening the power saw 10 to the slide 15 could be any other suitable arrangement depending on the make of power saw employed. Grooved guide rails 20 and 21 of about the same length as the slide 15 are fixed to the underside thereof and parallel to the long side, being spaced apart with the grooves 22 facing each other.

A base 23 has protrusions 24 along the lengthwise edges, which slidably fit in the grooves 22 and support the slide 15 above the base 23. The rear portion is narrowed to form a tongue 25 having a perforation in which is hooked one end of a tension spring 26 and the other end is hooked into a perforation in the table 10 near the end of the notch 17, thus providing retracting means for the slide member 15 to a stop position. Rails 20 and 21 have small notches 27 through which saw dust may be cleared by the protrusions 24 when the slide is moved to prevent clogging in the grooves 22.

A long steady member 28 is located near the forward end of base 23 and extends across both guide rails 20 and 21 and beyond guide rail 20 so an operator (not shown) may hold the device securely against lumber as shown in FIGURE 4. Reinforcing plate 29 is fixed to steady member 28. The engaging surface of steady member 28 is formed to a right angle.

Referring to FIGURE 1, a short straight slot 30 is cut in the base 23 between the guide rails 20 and 21, but close to guide rail 21 and the forward end being in line with the forward end of cutout 16. A curved slot 31 is cut within the guide rails 20 and 21 rearwardly of the slot 30. The steady member 28 is bolted to the base through the slot 30 by bolt 32, and at the reinforcing plate through curved slot 31 by slot 33. The steady member 28 may be rotated and shifted to travel according to bounds of the slots 30 and 31, and fixed in a desired position by loosening and tightening the bolts 32 and 33.

The curvature of slot 31 is generated by the simultaneous movement of bolt 32 in slot 30 while moving bolt 33 a proportionate amount until the steady member is disposed at an angle of 45° as shown in FIGURE 2; therefore with the slide in a retracted position, the marginal location of the cutting edge of the saw 11 (shown in FIGURE 1 in dash lines) in relation to an edge of lumber (not shown) on which the tool may be engaged will be approximately maintained at any angle that the steady member 28 may be set. While rotating the steady member 28, base 23 and slide 15 will be advanced due to the curvature of slot 31 and bolt 33 sliding therein.

Positioning of the saw tool for sawing is accomplished by loosening the bolts 32 and 33 freeing the steady member 28 for movement, an operator may rotate the steady member 28 to a desired angle and then tighten the bolts 32 and 33.

Referring to FIGURE 4 of the drawing, in performing the operation of sawing lumber, an operator (not shown) grasps the handle 14 with his right hand to set the steady member 28 of the device against a piece of lumber 34 at the desired mark for cutting, thereafter placing his left hand on the exposed end of the steady member 28 so as to hold the device from slipping; now the saw may be advanced by pushing handle 14 whereby the saw moves across the lumber to make a cut therethrough without guidance by sight.

The slide 15 will be retracted by the action of the tension spring 26 when relieved by the operator at the end of a cut, thereafter the device may be relocated for another cut.

While I have shown the preferred form of construction, I do not limit or restrict the invention to the exact details shown, as various modifications may be made without departing from the spirit of the invention as claimed:

I claim:
1. A combination of a power saw and a supporting device for said power saw:
   (a) said supporting device comprising an elongated slide and an elongated base;
   (b) means to guide the slide slidably with respect to the base;
   (c) means to restrict the movement of the slide and the base with respect to each other;
   (d) a long steady member attached to said base for engaging the material being sawed and extending laterally relative thereto;
   (e) said long steady member adjustable to position said combination of said power saw and supporting device with respect to the material being sawed.
- (f) means to mount said saw on said slide;
- (g) a first slot in the base and extending longitudinally thereof;
- (h) a first pin on said long steady member in said first slot;
- (i) a second slot in said base and curved eccentrically relative to the first slot.
- (j) a second pin on said long steady member in said second slot.
- (k) said first slot allowing said long steady member to move longitudinally as it is rotated with respect to said base with second pin in the second slot.

2. A combination according to claim 1 and comprising:
- (a) said slide having two spaced apart guide rails;
- (b) said base being positioned in said guide rails;
- (c) a stop on said slide to restrict the forward movement of the base with respect to the stop; and,
- (d) a means to restrict the rearward movement of the base with respect to the slide.

3. A supporting device for a power saw, said device comprising:
- (a) an elongated slide and an elongated base;
- (b) means to slidably guide said slide relative to said base;
- (c) means to restrict the movement of the slide and base with respect to each other;
- (d) a long steady member for engaging the material being sawed attached to and extending laterally from said base;
- (e) said long steady member being adjustable relative to said base to position the supporting device with respect to the material being sawed.
- (f) a pair of slots in the base, one slot is straight and the other slot is curved eccentrically to the straight slot.
- (g) a pair of pins fixed to said long steady member, one in each of said slots.
- (h) said straight slot allowing said long steady member to move longitudinally as it is turned relative to said base with the pin in the curved slot.

4. A supporting device according to claim 3 and comprising:
- (a) said slide having two spaced apart guide rails;
- (b) said base being positioned in said guide rails;
- (c) a stop on said slide to restrict the forward movement of the base with respect to the stop; and
- (d) a means to restrict the rearward movement of the base with respect to the slide.

References Cited
UNITED STATES PATENTS

| | | |
|---|---|---|
| 1,608,558 | 11/1926 | Hannah. |
| 1,706,115 | 3/1929 | Hannah. |
| 2,306,512 | 12/1942 | Whitney. |
| 3,073,360 | 1/1963 | Villanneva. |

DONALD R. SCHRAN, Primary Examiner